(12) United States Patent
Bar-Haim et al.

(10) Patent No.: US 9,428,655 B2
(45) Date of Patent: Aug. 30, 2016

(54) ELECTROSTATIC PRINTING

(75) Inventors: Gil Bar-Haim, Holon NA (IL); Amir Ofir, Nes Ziona (IL); Ilanit Mor, Kiryat Ono (IL); Alina Grishman, Rehovot (IL); Albert Teishev, Rishon le-zion (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 27 days.

(21) Appl. No.: 14/369,329

(22) PCT Filed: Jan. 16, 2012

(86) PCT No.: PCT/EP2012/050578
§ 371 (c)(1),
(2), (4) Date: Jun. 27, 2014

(87) PCT Pub. No.: WO2013/107498
PCT Pub. Date: Jul. 25, 2013

(65) Prior Publication Data
US 2014/0320576 A1 Oct. 30, 2014

(51) Int. Cl.
*B41J 2/41* (2006.01)
*C09D 11/02* (2014.01)
(Continued)

(52) U.S. Cl.
CPC .............. *C09D 11/02* (2013.01); *B41J 2/2107* (2013.01); *B41J 2/41* (2013.01); *B65B 3/00* (2013.01);
(Continued)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41J 2/41; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ........................................... 347/95–105, 112
See application file for complete search history.

(56) References Cited

U.S. PATENT DOCUMENTS 5,192,638 A 3/1993 Landa et al.
5,266,435 A 11/1993 Almog
(Continued)

FOREIGN PATENT DOCUMENTS

EP 2230279 A2 9/2010
JP S63502855 10/1988
(Continued)

OTHER PUBLICATIONS

Web page: http/www.guidechem.com/products/26264-05-1.html (Benzenesulfonic Acid, Dodecyl-, Compd. with Isopropylamine).

*Primary Examiner* — Manish S Shah
(74) *Attorney, Agent, or Firm* — HP Inc. Patent Department

(57) ABSTRACT

Described herein is a method for electrostatic printing including: (i) providing an ink composition having: a hydrocarbon carrier liquid and particles includes a resin and a colorant, and wherein the ink composition contains less than 0.3 mg of charge director per g of solids in the ink composition; (ii) adding a charge director to the ink composition, such that the total amount of charge director in the ink composition is at least 0.6 mg per g of solids in the ink composition, and, (iii) within a predetermined time of adding the charge director, printing the ink onto a print medium in an electrostatic printing process, wherein the predetermined time is 90 minutes or less.

14 Claims, 12 Drawing Sheets

(51) Int. Cl.
*B41J 2/21* (2006.01)
*G03G 9/135* (2006.01)
*G03G 9/13* (2006.01)
*C09D 11/033* (2014.01)
*C09D 11/037* (2014.01)
*B65B 3/00* (2006.01)
*B65D 85/00* (2006.01)

(52) U.S. Cl.
CPC ............ B65D 85/70 (2013.01); C09D 11/033 (2013.01); C09D 11/037 (2013.01); G03G 9/131 (2013.01); G03G 9/135 (2013.01); G03G 9/1355 (2013.01)

(56) References Cited

U.S. PATENT DOCUMENTS

| | | |
|---|---|---|
| 5,346,796 A | 9/1994 | Almog |
| 5,567,564 A | 10/1996 | Ziolo |
| 5,989,769 A * | 11/1999 | Mosher ............... G03G 9/135 399/237 |
| 6,070,042 A | 5/2000 | Landa et al. |
| 6,337,168 B1 | 1/2002 | Almog |
| 7,867,684 B2 * | 1/2011 | Watanabe ............ G03G 9/0832 430/112 |
| 2002/0077383 A1 | 6/2002 | Takao et al. |
| 2005/0160938 A1 | 7/2005 | Moudry et al. |
| 2009/0245873 A1 * | 10/2009 | Teshima ............... G03G 9/1355 399/237 |

FOREIGN PATENT DOCUMENTS

| | | |
|---|---|---|
| JP | H04118681 | 4/1992 |
| JP | H06077037 | 3/1994 |
| JP | 2001342388 | 12/2001 |
| JP | 2003520997 | 7/2003 |
| JP | 2003261807 | 9/2003 |
| JP | 2004029805 | 1/2004 |
| JP | 2010222384 | 10/2010 |
| WO | WO 2007/130069 | 11/2007 |
| WO | WO 2011/035811 | 3/2011 |
| WO | WO 2011/110221 | 9/2011 |

* cited by examiner

ELECTROSTATIC PRINTING

In general, electrostatic printing processes involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

In some systems, the electrostatic ink composition is applied to the PIP by pumping the ink between a stationary electrode and the PIP. Other electrostatic printing systems include a binary ink development (BID) unit. In such a system, the ink is applied to the photoconductive surface by a developer roller. Often, a different developer roller is used for each different color ink (e.g. cyan, magenta, yellow and black). Ink is applied to the developer roller by passing an electrostatic ink composition between a stationary charged electrode and the developer roller. Ideally, the charged toner particles should form a uniform layer on the development roller. The developer roller rotates, such that the charged particles contact the PIP electrically.

DETAILED DESCRIPTION

Figure 1A:
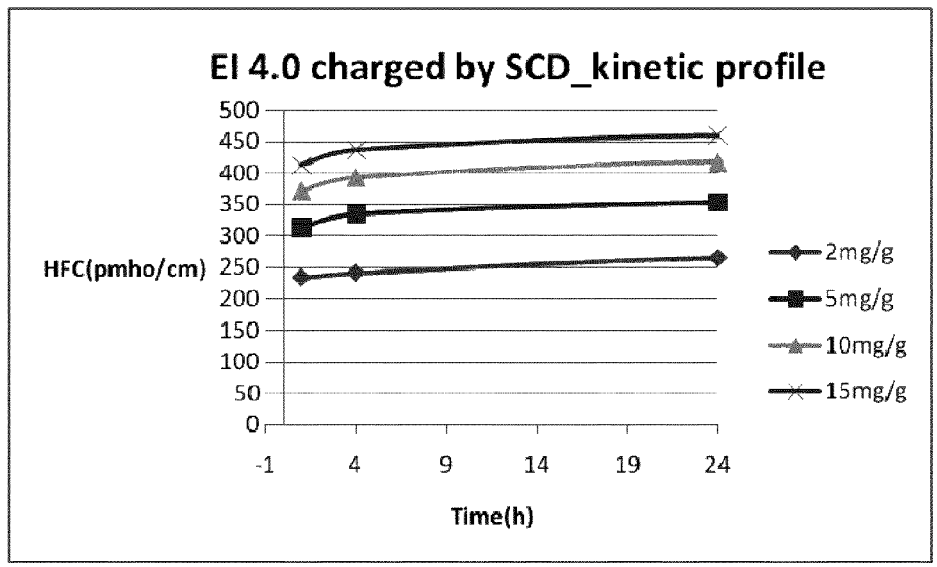
FIG. 1A shows the variation of high field conductivity of an example of an electrostatic ink composition containing a black pigment over a period of time following addition of a synthetic charge director.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "carrier liquid,", "carrier," refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "ink composition" can refer to a composition, which would be suitable for use as an electrostatic ink composition after a charge director has been added to impart a charge on particles of resin in the ink composition. As used herein, "electrostatic ink composition" generally refers to a ink composition in liquid form that is typically suitable for use in an electrostatic printing process, sometimes termed an electrophotographic printing process. The electrostatic ink composition may comprise chargeable particles of a resin, which may be as described herein, dispersed in a carrier liquid, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the ink composition.

As used herein, "acidity," "acid number," or "acid value" refers to the mass of potassium hydroxide (KOH) in milligrams that is required to neutralize one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the liquid toner composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate to a print medium either directly or indirectly via an intermediate transfer member. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field of 50-400V/μm, or more, in some examples 600-900V/μm, or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect described herein or any other feature.

In a first aspect, there is provided a method for electrostatic printing comprising:
(i) providing an ink composition comprising:
    a hydrocarbon carrier liquid and particles comprising a resin and a colorant, and wherein the ink composition contains less than 0.3 mg of charge director per g of solids in the ink composition;
(ii) adding a charge director to the ink composition, such that the total amount of charge director in the ink composition is at least 0.6 mg per g of solids in the ink composition, and,
(iii) within a predetermined time of adding the charge director, printing the ink onto a print medium in an electrostatic printing process,
    wherein the predetermined time is 90 minutes or less.

In a second aspect, there is provided a method for producing a packaged ink composition comprising:
(a) providing an ink composition comprising:
    a hydrocarbon carrier liquid and particles comprising a resin and a colorant, and wherein the ink composition contains less than 0.3 mg of charge director per g of solids in the ink composition;
(b) packaging the ink composition in a container and sealing the container.

In a third aspect, there is provided a packaged ink composition, wherein the ink composition comprises
a hydrocarbon carrier liquid and particles comprising a resin and a colorant, and wherein the ink composition contains less than 0.3 mg of charge director per g of solids in the ink composition,
and the ink composition is packaged in a sealed container.

The present inventors have found that embodiments of an ink composition with a very low amount or no charge director increases the shelf-life of the composition. The present inventors found that packaged ink compositions containing a charge director can deteriorate over a long period, for example if there is a long delay between producing the ink and its use in printing. The present inventors have also found that a charge director can be added relatively shortly before electrostatic printing, and desirable results still obtained. This is surprising as it was expected that the charging of resin particles due to a charge director would take a considerable period of time.

Hydrocarbon Carrier Liquid

The hydrocarbon carrier liquid is a liquid that comprises a hydrocarbon. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The carrier liquids and other components of the present disclosure are described in U.S. Pat. No. 6,337,168, U.S. Pat. No. 6,070,042, and U.S. Pat. No. 5,192,638, all of which are incorporated herein by reference.

The carrier liquid can include compounds that have a resistivity in excess of about $10^9$ ohm-cm. The carrier liquid may have a dielectric constant below about 5, in some examples below about 3.

In some examples, the carrier liquid constitutes about 5 to 99.5% by weight of the ink composition, in some examples 20 to 99.5% by weight of the ink composition, in some examples 50 to 99.5% by weight of the ink composition, in some examples 82% to 77% by weight of the ink composition. In other examples, the carrier liquid may constitute about 40 to 90% by weight of the ink composition, for example in step (i) of the first aspect and/or in the ink composition of the second and third aspects. In other examples, the carrier liquid may constitute about 60 to 80% by weight of the ink composition, for example in step (i) of the first aspect and/or in the ink composition of the second and third aspects. In other examples, the carrier liquid may constitute about 90 to 99.5% by weight of the ink composition, in some examples 95 to 99% by weight of the ink composition, for example in step (i) of the first aspect and/or in the ink composition of the second and third aspects.

In some examples, the solids content of the ink composition is less than 20 wt %, in some examples 1% to 20 wt %, in some examples 1 to 10 wt %, for example in step (i) of the first aspect and/or in the ink composition of the second and third aspects. In some examples, the solids content of the ink composition is 35% by weight or more, in some examples 45% by weight or more, for example in step (i) of the first aspect and/or in the ink composition of the second and third aspects. In some examples, the solids content of the ink composition is 15 to 25% by weight, in some examples 18 to 23% by weight, for example in step (i) of the first aspect and/or in the ink composition of the second and third aspects. In some examples, the solids content of the ink composition is 35% by weight or more, in some examples 40% by weight or more, for example in step (i) of the first aspect and/or in the ink composition of the second and third aspects.

In some examples, in step (ii) or step (iii) of the first aspect or in the second or third aspect, the carrier liquid may constitute 65% or less, in some examples 60% or less, by weight of the ink composition.

Resin

The resin can include, but is not limited to, a thermoplastic polymer. In some examples, the resin comprises a polymer having acidic or basic side groups. In some examples, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is in some examples from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with a counterion, typically a metal counterion, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The particles of the ink composition may comprise a resin comprising two different polymers having acidic side groups. The two polymers having acidic side groups may have different acidities, which may fall within the ranges mentioned above. The particles may comprise a first polymer having acidic side groups that has an acidity of from 50 mg KOH/g to 110 mg KOH/g and a second polymer having acidic side groups that has an acidity of 110 mg KOH/g to 130 mg KOH/g.

The particles of the ink composition may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The particles of the ink composition may comprise two different polymers having acidic side groups: a first polymer that is a copolymer of ethylene (e.g. 92 to 85 wt %, preferably about 89 wt %) and acrylic or methacrylic acid (e.g. 8 to 15 wt %, preferably about 11 wt %) having a melt flow rate of 80 to 110 g/10 minutes and a second polymer that is a co-polymer of ethylene (e.g. about 80 to 92 wt %, preferably about 85 wt %) and acrylic acid (e.g. about 18 to 12 wt %, preferably about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the embodiments mentioned above, the ratio of the first polymer having acidic side groups to the second polymer having acidic side groups can be from about 10:1 to about 2:1. In other examples, the ratio can be from about 6:1 to about 3:1, in some examples about 4:1.

The particles may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The particles may comprise a first polymer having a melt viscosity of 15000 poise or more, in some examples 20000 poise or more, in some examples 50000 poise or more, in some examples 70000 poise or more; and in some examples, the particles may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The particles may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If particles comprise a single type of resin polymer, the resin polymer (excluding any other components of the ink composition) may have a melt viscosity of 6000 poise or more, in some examples a melt viscosity of 8000 poise or more, in some examples a melt viscosity of 10000 poise or more, in some examples a melt viscosity of 12000 poise or more. If the particles comprise a plurality of polymers all the polymers of the particles may together form a mixture (excluding any other components of the ink composition)

that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The particles of the ink composition may comprise a resin comprising two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The particles may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In some examples, the resin constitutes about 5 to 90%, in some examples about 5 to 80%, by weight of the solids of the ink composition. In other examples, the resin constitutes about 10 to 60% by weight of the solids of the ink composition. In other examples, the resin constitutes about 15 to 40% by weight of the solids of the ink composition. In other examples, the resin constitutes about 60 to 90% by weight, in some examples from 70 to 80% by weight, of the solids of the ink composition.

The resin may comprise a polymer having acidic side groups, as described above (which is preferably free of ester side groups), and a polymer having ester side groups. The polymer having ester side groups is preferably a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In some examples, the first monomer constitutes 5 to 40% by weight of the co-polymer, the second monomer constitutes 5 to 40% by weight of the co-polymer, and with the third monomer constituting the remaining weight of the copolymer. In some examples, the first monomer constitutes 5 to 15% by weight of the co-polymer, the second monomer constitutes 5 to 15% by weight of the co-polymer, with the third monomer constituting the remaining weight of the copolymer. In some examples, the first monomer constitutes 8 to 12% by weight of the co-polymer, the second monomer constitutes 8 to 12% by weight of the co-polymer, with the third monomer constituting the remaining weight of the copolymer. In some examples, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the particles, e.g. the total amount of the polymer or polymers having acidic side groups and polymer having ester side groups. The polymer having ester side groups may constitute 5% or more by weight of the total amount of the resin polymers in the particles, in some examples 8% or more by weight of the total amount of the resin polymers in the particles, in some examples 10% or more by weight of the total amount of the resin polymers in the particles, in some examples 15% or more by weight of the total amount of the resin polymers in the particles, in some examples 20% or more by weight of the total amount of the resin polymers in the particles, in some examples 25% or more by weight of the total amount of the resin polymers in the particles, in some examples 30% or more by weight of the total amount of the resin polymers in the particles, in some examples 35% or more by weight of the total amount of the resin polymers in the particles. The polymer having ester side groups may constitute from 5% to 50% by weight of the total amount of the resin polymers in the particles, in some examples 10% to 40% by weight of the total amount of the resin polymers in the particles, in some examples 15% to 30% by weight of the total amount of the polymers in the particles.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In some examples, the polymer or polymers can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

The resin can encapsulate the colorant during grinding or mixing to create an ink particle. The ink particle can have a final particle size from about 1 micron to about 10 microns and produce a printed image at thickness of about 1 micron per separation. The resin encapsulated pigments can be formulated to provide a specific melting point. In one example, the melting point can be from about 30° C. to about 150° C. In another example, the melting point can be from about 50° C. to about 100° C. Such melting points can allow for desired film formation during printing. The ink composition may contain particles which comprise the resin, the particles and colorant, which may be homogenously distributed throughout each particle.

Colorant

The ink composition comprises a colorant. The colorant may be a pigment selected from a black pigment, a cyan pigment, a yellow pigment and a magenta pigment. Such pigments are known to the skilled person. The pigment may be an inorganic pigment or an organic pigment. The colorant dispersed in the carrier liquid can be any colorant compatible with the carrier liquid and useful for electrostatic printing. For example, the colorant may be present as pigment particles, or may comprise a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200

Charge Director

The method of the first aspect includes the step of (i) providing an ink composition comprising:

(a) a hydrocarbon carrier liquid and particles comprising a resin and a colorant, and wherein the ink composition contains less than 0.3 mg of charge director per g of solids in the ink composition;

(ii) adding a charge director to the ink composition, such that the total amount of charge director in the ink composition is at least 0.6 mg per g of solids in the ink composition.

The amounts of charge director in the aspects described herein may relate to the total amount of charge director in the ink composition. In some examples, a plurality of types of charge director may be included in the ink composition and the amounts are the sum of the different types of charge director in the ink composition.

As mentioned above, the charge director is added to the carrier liquid in order to maintain sufficient electrostatic charge on the ink particles. Below a level of 0.3 mg of charge director per g of solids of the ink composition, little, if any, charging effect is seen. In step (i) of the first aspect, and in the ink compositions of the second and third aspects, the ink composition may contain less than 0.2 mg of charge director per g of solids in the ink composition, in some examples less than 0.1, in some examples less than 0.05 charge director per g of solids in the ink composition. In some examples, in step (i) of the first aspect, and in the ink compositions of the second and third aspects, the ink composition is substantially free or free of charge director. In some examples, in step (i) of the first aspect, and in the ink compositions of the second and third aspects, charge director is defined as a director that imparts a negative charge on the particles comprising a resin and a colorant, and/or a director that imparts a positive charge on on the particles comprising a resin and a colorant. In some examples, in step (i) of the first aspect, and in the ink compositions of the second and third aspects, charge director is defined as a director selected from of metal salts of sulfo-succinates, metal salts of oxyphosphates, metal salts of alkyl-benzenesulfonic acid, metal salts of aromatic carboxylic acids or sulfonic acids, polyoxyethylated alkylamines, lecithin, polyvinylpyrrolidone and organic acid esters of polyvalent alcohols. In some examples, in step (i) of the first aspect, and in the ink compositions of the second and third aspects, the ink composition is substantially free or free of metal salts of sulfosuccinates, metal salts of oxyphosphates, metal salts of alkyl-benzenesulfonic acid, metal salts of aromatic carboxylic acids or sulfonic acids, polyoxyethylated alkylamines, lecithin, polyvinylpyrrolidone and organic acid esters of polyvalent alcohols. In some examples, in step (i) of the first aspect, and in the ink compositions of the second and third aspects, the ink composition is substantially free or free of oil-soluble petroleum sulfonates (e.g. neutral Calcium Petronate™, neutral Barium Petronate™, and basic Barium Petronate™), polybutylene succinimides (e.g. OLOA™

1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, in step (i) of the first aspect, and in the ink compositions of the second and third aspects, the ink composition is substantially free or free of sulfonic acids, including, but not limited to, alkyl sulfonic acids, aryl sulfonic acids, and sulfonic acids of alkyl succinates (e.g. see WO 2007/130069).

In some examples, a charge director is a substance, which, when added to an ink composition absent this substance, in an amount of 5 mg of the substance per g of solids of the ink composition, increases the high field conductivity of the ink composition, over a period of 24 hours, by at least 5%, in some examples by at least 10%, in some examples by at least 20%, in some examples by at least 30%, in some examples by at least 50%, in some examples by at least 100%. The high field conductivity, in this context, is measured at 1500 V/mm using a DC current at 23°.

Step (ii) of the first aspect involves adding a charge director to the ink composition, such that the total amount of charge director in the ink composition is at least 0.6 mg per g of solids in the ink composition, in some examples at least 1 mg per g of solids in the ink composition, in some examples at least 1.5 mg per g of solids in the ink composition, in some examples at least 2 mg per g solids in the ink composition, in some examples at least 3 mg per g of solids in the ink composition, in some examples at least 4 mg per g of solids in the ink composition, in some examples at least 5 mg per g of solids in the ink composition, in some examples at least 10 mg per g of solids in the ink composition, in some examples from 1 to 20 mg per g of solids in the ink composition, in some examples from 1 to 15 mg per g of solids in the ink composition, in some examples from 2 to 15 mg per g of solids in the ink composition, in some examples from 3 to 10 mg per g of solids in the ink composition. 0.6 mg of charge director per g of solids in the ink composition has been found to be suitable minimum amount of charge director to effect charging on the ink composition, which may, for example, be a working dispersion, e.g. in an electrostatic printing press.

In step (ii), the charge director added may be a director that imparts a negative charge on the particles comprising a resin and a colorant, or a director that imparts a positive charge on the particles comprising a resin and a colorant. In some examples, the charge director may be selected from ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition.

The charge director used herein can be any as known in the art such as described in U.S. Pat. No. 5,346,796, which is incorporated herein by reference in its entirety.

In some examples, the charge director comprises a sulfosuccinate moiety of the general formula [$R_1$—O—C(O)CH$_2$CH(SO$_3^-$)C(O)—O—$R_2$], where each of $R_1$ and $R_2$ is an alkyl group. In some examples, the charge director comprises nanoparticles of a simple salt and a sulfosuccinate salt of the general formula MA$_n$, wherein M is a metal, n is the valence of M, and A is an ion of the general formula [$R_1$—O—C(O)CH$_2$CH(SO$_3^-$)C(O)—O—$R_2$], where each of $R_1$ and $R_2$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, NH$_4$, tert-butyl ammonium, Li$^+$, and Al$^{+3}$, or from any sub-group thereof. The simple salt may comprise an anion selected from SO$_4^{2-}$, PO$_3^{3-}$, NO$_3^-$, HPO$_4^{2-}$, CO$_3^{2-}$, acetate, trifluoroacetate (TFA), Cl$^-$, Bf, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP).

In the formula [$R_1$—O—C(O)CH$_2$CH(SO$_3^-$)C(O)—O—$R_2$], in some examples each of $R_1$ and $R_2$ is an aliphatic alkyl group. In some examples, each of $R_1$ and $R_2$ independently is a C$_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is C$_{13}$H$_{27}$. In some examples, M is Na, K, Cs, Ca, or Ba. The formula [$R_1$—O—C(O)CH$_2$CH(SO$_3^-$)C(O)—O—$R_2$] and/or the formula MA$_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda. The charge director may be as described in U.S. Pat. No. 5,266,435, which is incorporated herein by reference in its entirety.

The charge director, in step (ii) of the first aspect, may comprise a sulfosuccinate moiety of the formula [$R_1$—O—C(O)CH$_2$CH(SO$_3^-$)C(O)—O—$R_2$], where each of $R_1$ and $R_2$ is an alkyl group, and an alkyl benzene sulfonic acid. The present inventors have found that a combination of a sulfosuccinate moiety of the formula [$R_1$—O—C(O)CH$_2$CH(SO$_3^-$)C(O)—O—$R_2$], where each of $R_1$ and $R_2$ is an alkyl group, and an alkyl benzene sulfonic acid has been found decrease the time it takes for the resin particles in the ink to become fully charged. The alkylbenzene sulfonic acid may be of the formula

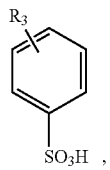

wherein $R_3$ is an alkyl group, in some examples $C_5$ to $C_{15}$ alkyl group, in some examples $C_{10}$ to $C_{14}$ alkyl group, in some examples a $C_{12}$ alkyl group. $R_3$ is preferably in the para position on the benzene ring relative to the $SO_3H$ group and is preferably a straight-chain alkyl group. The alkyl benzene sulphonic acid may be present, in some examples in an equimolar amount, with an alkyl amine, in some examples an isoalkyl amine, e.g. isopropyl amine.

In some examples the ink composition, in step (i) of the first aspect, and in the ink compositions of the second and third aspects, comprises an aluminium salt, such as an aluminium, salt of a fatty acid, including, but not limited to aluminium stearate. This acts to stabilise the charge on resin particles after addition of a charge director. In some examples, aluminium salts, including aluminium stearate, are not charge directors, for example when used in combination with a resin having acidic side groups.

The charge director, for example in step (i) and/or step (ii) and in the ink compositions of the second and third aspects, may be a charge director that imparts a positive charge on the particles comprising a resin, for example as described in WO 2011/110221, for example selected from an organic multivalent salt, for example zirconium octoate or zirconium 2-ethyl hexanoate. The ink composition, for example in step (i) and/or step (ii) and in the ink compositions of the second and third aspects, may comprise an acidic charge adjuvant, for example as described in WO 2011/110221, for example 2-(4-chlorophenyl)-3-methylbutyric acid or 4-(2,4-dichlorophenoxy)butyric acid. The charge director, for example in step (i) and/or step (ii) may be a charge director that imparts a positive charge on the particles comprising a resin, the ink composition, for example in step (i) or step (ii), may comprise an acidic charge adjuvant, and the resin may be a basic resin, for example as described in WO 2011/110221, for example a homopolymer or a copolymer of vinyl pyrrolidone, for example a vinyl pyrrolidone/triacontene copolymer.

Step (iii) of the First Aspect

Step (iii) of the first aspect involves, within a predetermined time of adding the charge director, printing the ink onto a print medium in an electrostatic printing process, wherein the predetermined time is 90 minutes or less.

In some examples, the predetermined time is in some examples 75 minutes or less, in some examples 60 minutes or less. The predetermined time is in some examples at least 20 minutes, in some examples at least 30 minutes. The predetermined time is in some examples from 20 minutes to 90 minutes, in some examples from 30 minutes to 60 minutes.

The electrostatic printing process may comprise:
forming a latent electrostatic image on a surface;
contacting the surface with the ink composition, such that at least some of the particles adhere to the surface to form a developed toner image on the surface, and transferring the toner image to the print medium.

The surface on which the latent electrostatic image is formed may be on a rotating member, e.g. in the form of a cylinder. The surface on which the latent electrostatic image is formed may form part of a photo imaging plate (PIP). The contacting may involve passing the ink composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the ink composition to an electric field having a field of 50-400V/μm, or more, in some examples 600-900V/μm, or more.

The intermediate transfer member may be a rotating flexible member, which is in some examples heated, e.g. to a temperature of from 80 to 160° C., in some examples from 90 to 130° C., in some examples from 100 to 110° C.

The print medium may be or comprise any suitable substrate. The print medium may be any suitable substrate capable of having an image printed thereon. The print medium may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may in some examples be biaxially orientated polypropylene. The material may comprise a metal, which may be in sheet form. The metal may be selected from or made from, for instance, aluminum (Al), silver (Ag), tin (Sn), copper (Cu), mixtures thereof. In some examples, the print medium comprises a cellulosic paper. In some examples, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The print medium is in some examples a cellulosic print medium such as paper. The cellulosic print medium is in some examples a coated cellulosic print medium, e.g. having a coating of a polymeric material thereon.

The method of the first aspect may be carried out so that a plurality of impressions or copies are carried out. The number of impressions or copies may be at least 1000, in some examples at least 2000, in some examples at least 3000, in some examples at least 5000. The print coverage on each print substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of the first aspect may be carried out so that a plurality of print media sheets are printed, for example 250 or more print media sheets, in some examples 500 or more print media sheets, in some examples 750 or more print media sheets, in some examples 1000 or more print media sheets. The sheets may be any suitable size or shape, e.g. of standard printing size, such as A4 or A3.

Second and Third Aspects

In a second aspect, there is provided a method for producing a packaged ink composition comprising:

(a) providing an ink composition comprising:
  a hydrocarbon carrier liquid and particles comprising a resin and a colorant, and wherein the ink composition contains less than 0.3 mg of charge director per g of solids in the ink composition;
(b) packaging the ink composition in a container and sealing the container.

The method of the second aspect may include, as a first step, producing an ink composition, the producing step comprising:
  combining the hydrocarbon carrier liquid, the resin, the colorant to provide the ink composition comprising a hydrocarbon carrier liquid and particles comprising a resin and a colorant, and wherein the ink composition contains less than 0.3 mg of charge director per g of solids in the ink composition.

The producing step can comprise mixing the resin, the colorant and the hydrocarbon carrier liquid under appropriate conditions to form the particles comprising the resin and the colorant within the carrier liquid. A further additive or additives as described herein may be added at any time during the method. The step of combining the resin and colorant can include grinding the resin and the colorant in the carrier liquid.

The ink composition may be as described herein, e.g. in connection with the first aspect.

In a third aspect, there is provided a packaged ink composition, wherein the ink composition comprises
  a hydrocarbon carrier liquid and particles comprising a resin and a colorant, and wherein the ink composition contains less than 0.3 mg of charge director per g of solids in the ink composition,
and the ink composition is packaged in a sealed container.

The container in the second and third aspects may be any suitable container. The container is preferably a container that allows the ink composition to be transported, and preferably prevents evaporation of the carrier liquid from the container. In some examples, the container comprises walls comprising a polymer. For example, the container may be or comprise a plastic tube. In some examples, the container comprises walls comprising a metal, which may be selected from steel, e.g. stainless steel, or aluminium. In some examples, the container may be or comprise an aluminium receptacle, e.g. an aluminium tube. The container may be in the form of a can, e.g. a cylindrical can, e.g. having walls comprising a metal. The can may be sealed with a suitable closure device, e.g. a cap or valve, and may be such that it can be automatically opened by a printing apparatus. Such cans are known to those skilled in the art. In other examples, the can may be an ink concentrate container, comprising an inner volume, for containing the ink composition as described herein (which may alternatively be termed an ink concentrate), an outlet, and at least one flexible wall extending along the inner volume, so that the ink composition can be pressed through the outlet out of the inner volume by deforming the flexible wall. Such an ink concentrate container is described in WO 2011/035811, which is incorporated herein by reference in its entirety.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1

"Coral" Ink Formulation

This Example describes the production of an ink composition/formulation lacking a charge director. This ink formulation uses a formulation with the resins Nucrel 925, Nucrel 2806 and Bynel 2022 in weight proportions 72:18:10 respectively, and is prepared with Isopar L to make paste that then added with pigment, VCA(di/tri Al stearate salt) and HPB. This ink is then diluted to working dispersion solid concentration by adding a heavy oil, such as Isopar and/or Marcol.

The general procedure for producing the ink formulation is described below.

As a first step, the resins Nucrel 925, Nucrel 2806 and Bynel 2022 in weight proportions 72:18:10 respectively were mixed in a Ross double planetary mixer with 1500 grams of Isopar L (an iso-parfinic oil manufactured by EXXON) carrier liquid at a speed of 60 rpm and a temperature of 130° C. for one hour. The total amount of resins in each case was 1000 g. The temperature is then reduced and mixing is continued until the mixture reaches room temperature. During mixing the polymer solvates the Isopar and during the cooling granules of polymer (with solvated carrier liquid) in carrier liquid are produced.

As a second step, 1000 grams of the mixture produced in the first step is charged into a Union Process 1S ball atritor together with 5 grams of aluminum tri-stearate (Riedel de-Haan) as a charge adjuvant and an appropriate amount of pigment. To make a cyan composition, the pigments TB5 and BSG87 were added so that they formed 12.1 and 0.9 wt %, respectively, of the solids of the composition; TB5 indicates a main Cyan pigment, a phthalocyanine pigment blue 15:3 provided by TOYO company. BSG87 indicates a secondary Cyan pigment, a phthalocyanine pigment green 7 provided by BASF company.

For a black ink composition, TB5 and BSG87 were replaced with 15.8 and 3.2 wt % (of the solids in the composition) of the pigment Monarch 800 and Alkali Blue D6200, respectively (available from Cabot AND Flint Group, respectively). For a yellow ink composition, TB5 and BSG87 were replaced with 11.2 and 2.8 wt % (of the solids in the composition) of the pigment Paliotol Yellow D1155 and Paliotol Yellow D1819, respectively (both available from BASF). For a magenta ink composition, TB5 and BSG87 were replaced with 18 and 2.5 wt % (of the solids in the composition) of the pigment Permanent Carmine FBB02 and Quindo Magenta 122, respectively (available from Clariant and Sun Chemical, respectively).

The toner concentrate made above containing resin particles of Nucrel 925, Nucrel 2806 and Bynel 2022 is diluted with additional Isopar L to produce a toner having a 2% NVS, with 98% of the carrier liquid being Isopar L.

Wax particles suspended in Isopar-L in a weight percentage of 4.5% with respect to the NVS of the toner particles were added. The wax was a polyethylene wax, Acumist B6, available from Honeywell.

The ink composition produced above lacks a charge director. This ink formulation will be referred to as "Coral" ink below. A charge director is added to the formulation before each of the tests described below in Example 3 onwards.

Example 2

"4.0" Ink Formulation

This Example describes the production of a further ink formulation, again lacking a charge director. This ink formulation was produced using a lab grinding tool called attritor S1, by mixing the formulation as set out below in Table I:

TABLE I

| Cyan | EI 4.0 (wt %) | Weight attritor (g) | % NVS |
|---|---|---|---|
| Resins | 76.8 | 1503.3 | 25% |
| TB5 | 12.1 | 59.21 | |
| BSG87 | 0.9 | 4.40 | |
| VCA | 2.2 | 10.77 | |
| HPB | 6 | | |
| DS72 | 2 | 9.79 | |
| Sol-L | | 712.5 | |
| % NVS atr. | 20.00% | | |
| Total weight atr. | 2300 | 2300 | |

The 'Resins' used in the above were Nucrel 699, available from DuPont, and A-C 5120, available from Honeywell, in the weight ratio of 4:1.

TB5 indicates a main Cyan pigment, a phthalocyanine pigment blue 15:3 provided by TOYO company. BSG87 indicates a secondary Cyan pigment, a phthalocyanine pigment green 7 provided by BASF company. For a black ink composition, TB5 and BSG87 were replaced with 15.8 and 3.2 wt % (of the solids in the composition) of the pigment Monarch 800 and Alkali Blue D6200, respectively (available from Cabot AND Flint Group, respectively). For a yellow ink composition, TB5 and BSG87 were replaced with 11.2 and 2.8 wt % (of the solids in the composition) of the pigment Paliotol Yellow D1155 and Paliotol Yellow D1819, respectively (both available from BASF). For a magenta ink composition, TB5 and BSG87 were replaced with 18 and 2.5 wt % (of the solids in the composition) of the pigment Permanent Carmine FBB02 and Quindo Magenta 122, respectively (available from Clariant and Sun Chemical, respectively).

VCA indicates an aluminium tristearate and palmitate salt, available from Riedel de-Haan.

HPB indicates an homopolymer polyethylene wax, available under the trade name Acumist B6 from Honeywell company.

DS72 is a silica powder, available under the trade name Aerosil R 7200 from Degussa-Evonik.

Sol-L indicates Isopar L, an iso-parfinic oil manufactured by EXXON.

The HPB was added later to the ink dispersion while mixing.

The grinding was carried out in two steps:
i) Hot stage—53° C. for 1.5 hour.
ii) Cold stage—45° C. for 10.5 hour.

This produced an ink having about 20% solids content. This ink is then diluted to 2% NVS, and then the following additives added, as shown in Table II:

TABLE II

| W-12 | NCD | SVM | SE-15 | Marcol | HPB |
|---|---|---|---|---|---|
| 4.0 4% W12/ ink solids | 1.5 mg NCD(4.0)/g | 0.07 mg SVM300/gr Sol-L | 0.0051 mg SE15/gr Sol-L | 8.5 mg M- 1/gr Sol-L | 6% on solids |

*unless stated otherwise below
W12 is a Teflon powder.
SVM is high viscous, 300 kcSt, Silicon oil, available under the trade name SIG5840 from ABCR
SE-15 is a defoamer silicon additive, available under the trade name KSG-15 from ShinEtsu.
Marcol is a high viscous paraffinic oil with a viscosity of 0.83 gr/cc.

This ink composition lacks a charge director. This formulation will be termed "4.0" below. The charge director was added immediately before each of the tests described in Example 3 onwards.

The charge directors used in the tests below are as follows:

NCD—this indicates a natural charge director having the components: (i) natural soya lecithin (6.6 wt %) (ii) basic barium petronate (9.8 wt %) and (iii) Isopropyl amine dodecyl benzene sulphonic acid (3.6 wt %) in Isopar (80 wt %). When a weight of this NCD is referred to in the later Examples and the Figures, it refers to the combined weight of (i) natural soya lecithin (ii) basic barium petronate and (iii) dodecyl benzene sulphonic acid per gram of solids in the ink composition.

SCD—this indicates a synthetic charge director, namely a barium bis sulfosuccinate salt, as described in WO2007130069, including a sulfosuccinate moiety of the general formula $[R_1\text{—O—C(O)}CH_2CH(SO_3^-)OC(O)\text{—O—}R_2]$, wherein each of $R_1$ and $R_2$ independently is a $C_{6-25}$ alkyl, generally mainly C13 alkyl. When a weight of this SCD is referred to in the later Examples and the Figures, it refers to the weight of a barium bis sulfosuccinate salt per gram of solids in the ink composition.

In some of the tests below, and as mentioned in some of the Figures, a further charge director termed "GT" is added to the SCD-containing formulations. "GT" in the present context indicates dodecyl benzene sulphonic acid isopropyl amine salt. When a weight of GT is indicated in the Figures, it refers to the weight of indicates dodecyl benzene sulphonic acid isopropyl amine salt per gram of solids in the ink composition.

Example 3

This aim of this test was to evaluate the charging build up time to obtain an optimal stable charging ink dispersion.

Figure 1B:
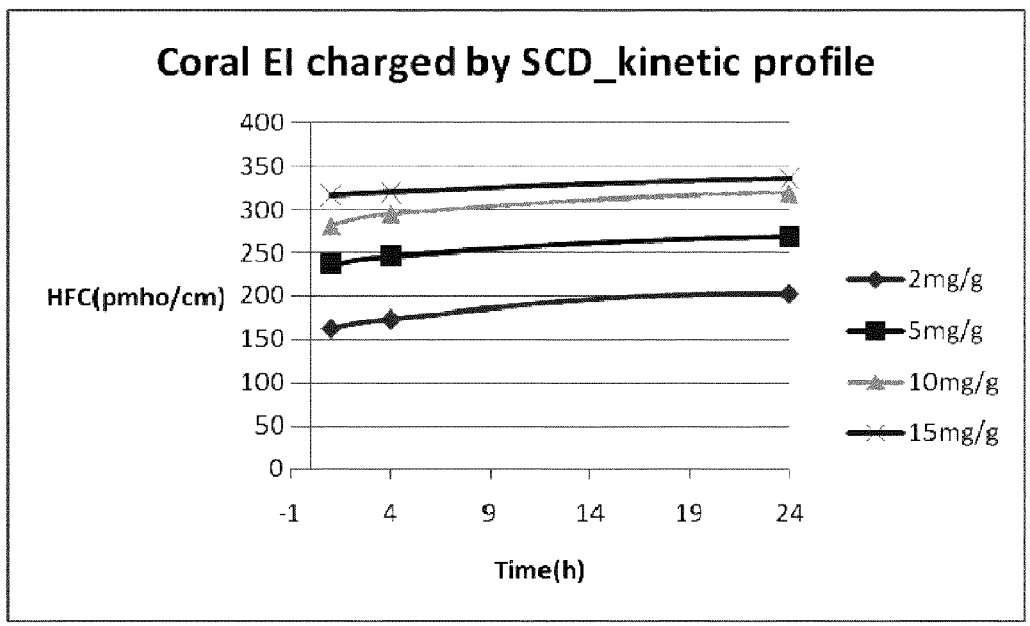
FIG. 1B shows the variation of high field conductivity of a further example of an electrostatic ink composition containing a black pigment over a period of time following addition of a synthetic charge director.

A conductivity meter device (with the trade name High Field Conductivity Meter (HFCM), available from HP-Indigo was used to measure the high field conductivity of tested ink over a period of at least 4 hours from the charging of ink sample. The high field conductivity is measured at 1500 V/mm using a DC current at 23°. The results are illustrated in FIGS. 1A and 1B. FIG. 1A refers to ink formulation 4.0 having a black pigment and charged with SCD and FIG. 1B refers to the Coral ink formulation having a black pigment and charged with SCD. In these Figures, it is possible to see that in both cases almost all the charging is achieved by the first measured timepoint, i.e. after 1 hour of adding the charge director. The preconception that an electrostatic ink needs an overnight or at least 24 hour of incubation time for the optimal charging of electroink is shown here as not correct. The charge directors used in these electrostatic inks have a faster charging kinetics than previously believed. The kinetics of charging development and stability over time in this test is a strong indication of charging stability, and is an indication that similar results should be shown in an actual electrostatic printing process.

Figure 1C:
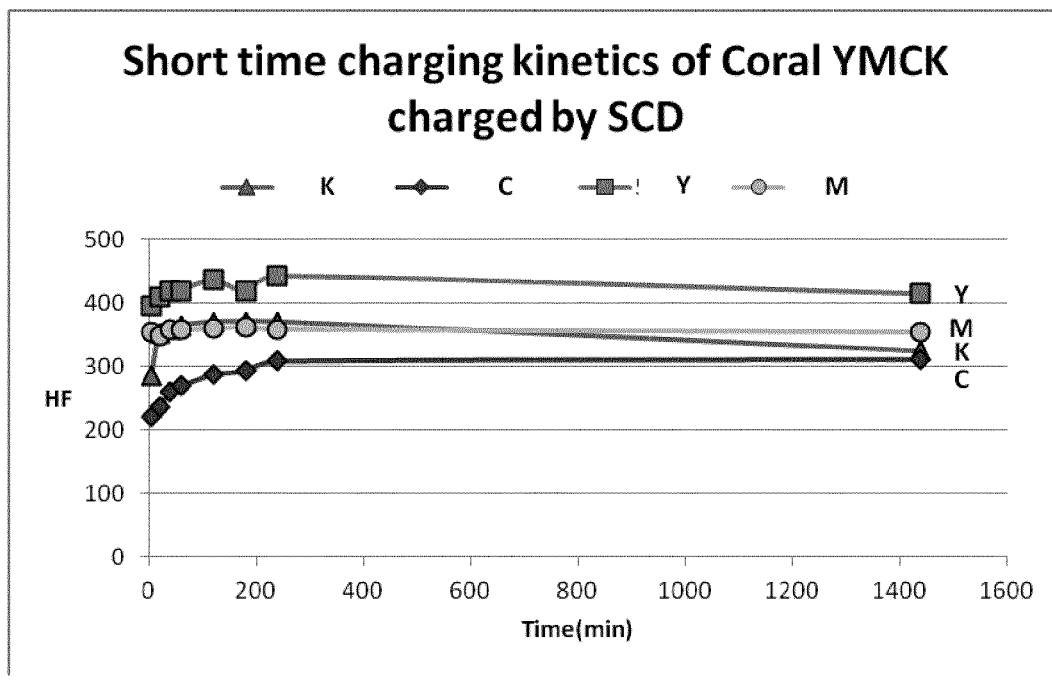
FIG. 1C shows the variation of high field conductivity of examples of electrostatic ink compositions, each one containing a different pigment (black, yellow, magenta and cyan) over a period of time following addition of a synthetic charge director.

In a further test, the charging kinetics of SCD in YMCK color based Coral ink formulations were examined. The results are illustrated in FIG. 1C. In this figure "HF" on the Y axis indicates the high field conductivity in pmho/cm. Here, this offline test checked the evolution of charging in small time increments from addition of the SCD, at 5, 10, 20, 40, 60, 120, 180, 240, 1440 minutes, where the HF value taken at the last time point at 24 h (seen also in FIGS. 1A and AB) indicates that there is a slight decline in the charging from 240 minutes. In FIG. 1C it is possible to see the charging evolution for each color when charged with SCD common concentration (5-9 mg/g) to be in press working window.

Example 4

From these initial indications in Example 3, the present inventors wished to test the inks on a printing press to record the charging build up time of uncharged ink dispersion.

In this test, the optical density on a printing press at a number of time points from adding the charge director was measured. The printing press used was HP Indigo 7000 Digital Press, available from HP-Indigo. The aim was to see how long it took the optical density to stabilize, and if the stable value was within an acceptable window. The developing voltage was kept constant in each test.

Figure 2A:
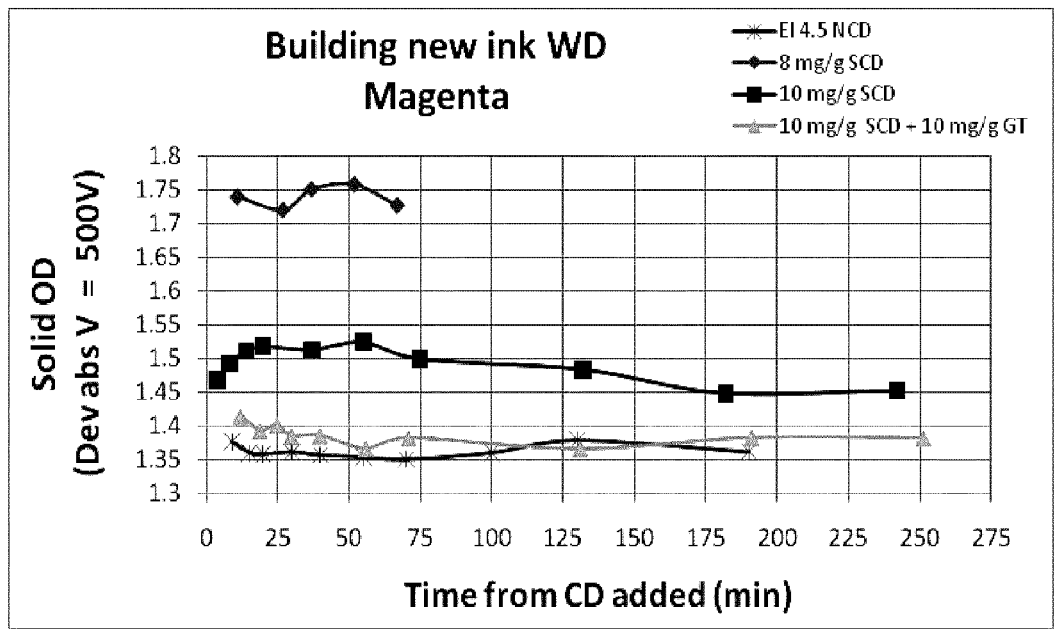
FIG. 2A shows the change in optical density for various examples of an electrostatic ink compositions containing a magenta ink over a period of time following addition of a varying amounts and types of charge director.
Figure 2B:
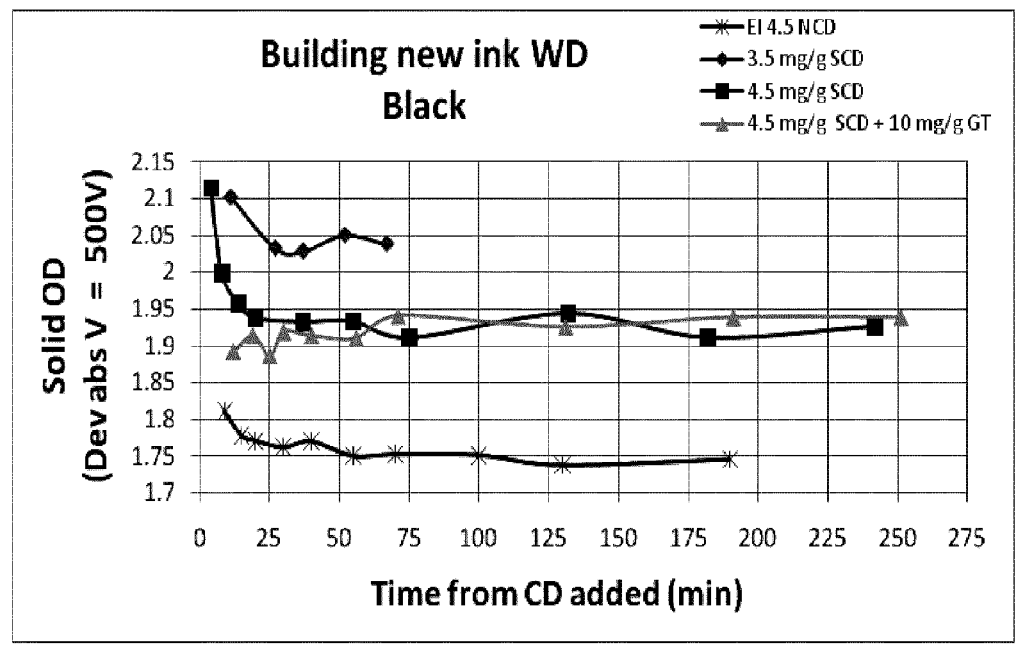
FIG. 2B shows the change in optical density for various examples of an electrostatic ink compositions containing a black ink over a period of time following addition of a varying amounts and types of charge director.

The results are shown in FIGS. 2A, 2B, 2C and 2D, which show results, respectively, for inks containing magenta, black, cyan and yellow pigments. In FIG. 2A, it is possible to see that the magenta ink becomes quite stabilized where the OD set point is 1.45 and the upper window limit is at 1.5. The relative changes in OD are within the desired specifications for future press generation ~a 0.03 change in OD. The black ink (FIG. 2B) also shows a relatively short charging stabilization time of ~20 min. In both magenta and black inks, the GT addition helps to reduce the stabilization time. Here also, the inventors found that NCD-containing inks charged a bit faster than the SCD-containing inks.

Figure 2C:
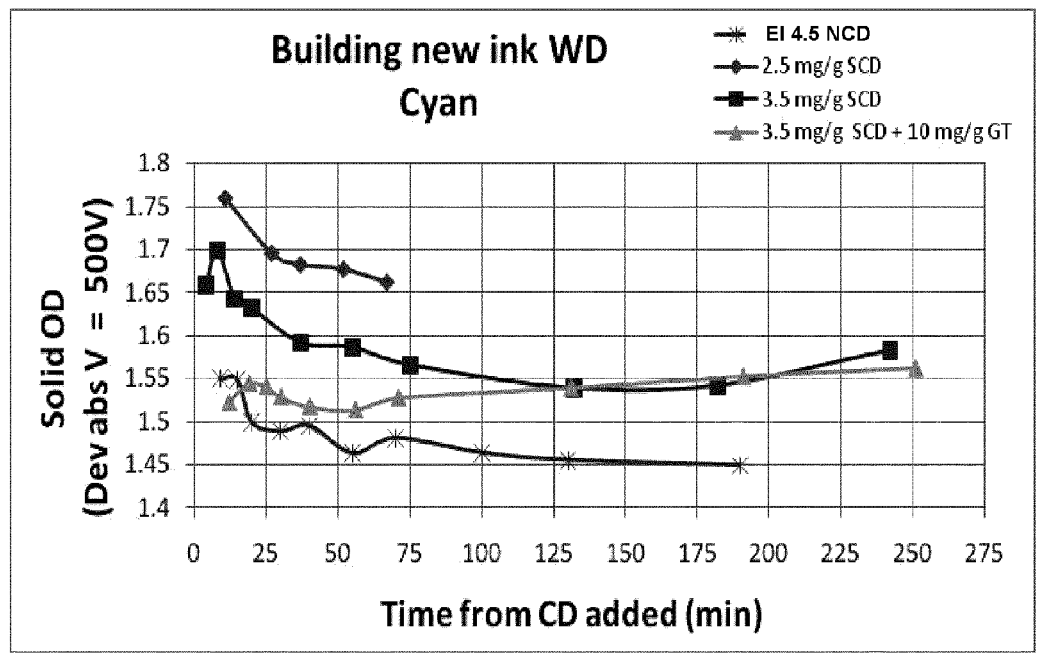
FIG. 2C shows the change in optical density for various examples of an electrostatic ink compositions containing a cyan ink over a period of time following addition of varying amounts and types of charge director.
Figure 2D:
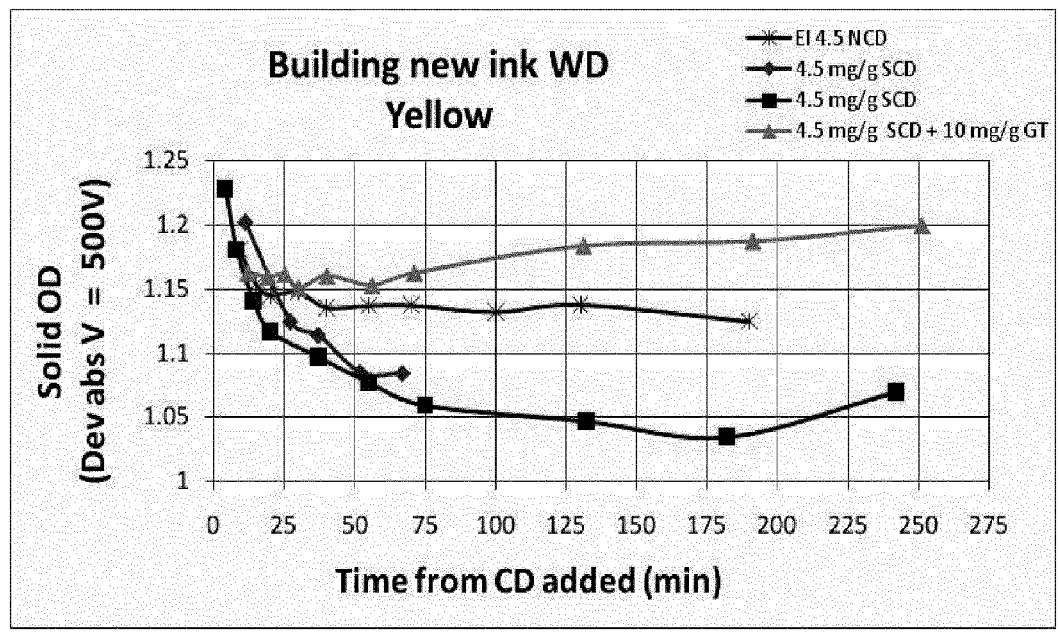
FIG. 2D shows the change in optical density for various examples of an electrostatic ink compositions containing a yellow ink over a period of time following addition of varying amounts and types of charge director.

Yellow and Cyan were found to have relatively long stabilization time to achieve a desired OD set point, as illustrated in FIGS. 2C and 2D, respectively.

From the results above, the inventors estimated that for most colors they could start printing after 0.5 h. During the test, the present inventors monitored the OD while printing, to check the OD stability after the addition of the charge director. They also monitored the developing voltage to see if there is a decline in charging while ink solids are added.

Table III summarizes the results and compares the SCD and NCD charge directors. These results are for a Coral ink formulation. The amount of SCD added to the formulation in each case was 3.5-10 mg/g (depending on the color of the ink and the test). The amount of NCD added to the formulation in each case was 28-50 cc.

TABLE III

| Color | Time take to reach charging stability after adding SCD to uncharged new ink working dispersion | Time taken to reach charging stability after adding NCD to uncharged new ink working dispersion |
| --- | --- | --- |
| Yellow | 75 min | 20 min |
| Magenta | 25 min | 20 min |
| Cyan | 55 min | 55 min |
| Black | 25 min | 20 min |

NB: with 10 mg/g of GT, all of the inks' charging stability time was less than 20 minutes. Additionally, the charging set point was shifted, with the shift direction (high charging/lower charging) being color dependent.

In the above table, it is possible to see that the build-up charging time is quite similar between SCD and NCD for most coloured inks, despite the difference in their chemistries. The only difference appears to be with Yellow. Whilst developing voltage is correlated to OD of the printed image, and could serve as a possible measurement, the present inventors considered that they would rather measure the OD directly to quantify how the build-up (i.e. charging) time is expressed during printing performance, as OD is the one of the most important factors in print quality.

Example 5

Addition of Uncharged Ink while Printing

Besides ink dispersion buildup, the other aspect that the present inventors wished to investigate was the effect of the addition of uncharged ink while printing. If the rate of charging of the new added amount of uncharged ink was slow, the charging would decline while printing, especially when printing a high coverage image. Without having the whole new charging systems correcting automatically the charging on the inks the inventors decided to check this aspect by investigating the following two questions:
 1. How much SCD is it desirable to add or what is the consumption of SCD?
 2. and does this fit with alternative printing systems in development?

Figure 3:
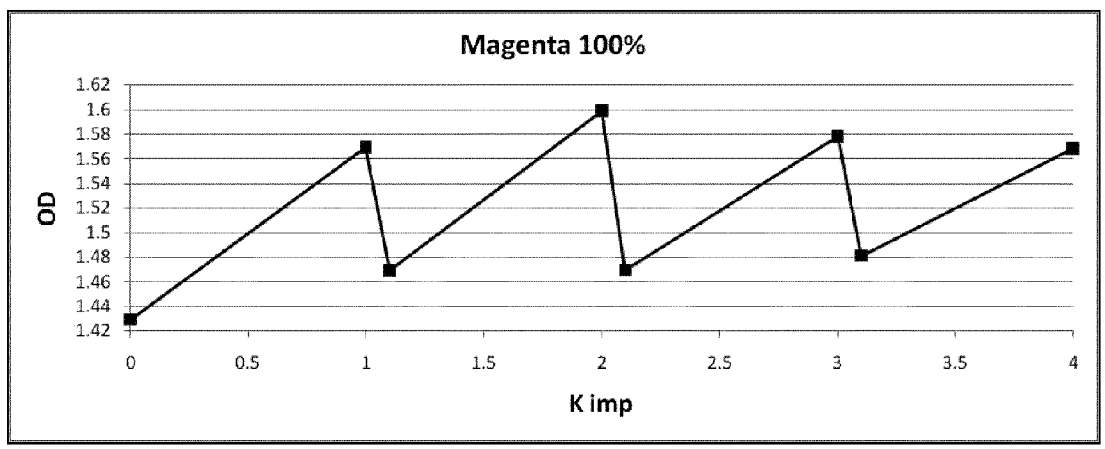
FIG. 3 shows the variation in the optical density when printing with an example of an electrostatic ink containing a magenta pigment over time, with the addition of uncharged ink (i.e. ink lacking a charge director) at regular intervals (every 1000 impressions). The printing coverage of the print substrate was 100%.

The first question was checked mainly for Magenta, the weak charging color and black the strong charging color. From printing 100% solid coverage the inventors saw that that the change in OD for 1 Kimp is ~0.1. The test was done with Coral Magenta electroink, and the results are shown in FIG. 3. If the acceptable change in OD is 0.03, then it is possible to conclude that the charge director should be added approximately every 330 impressions while printing.

Figure 4:
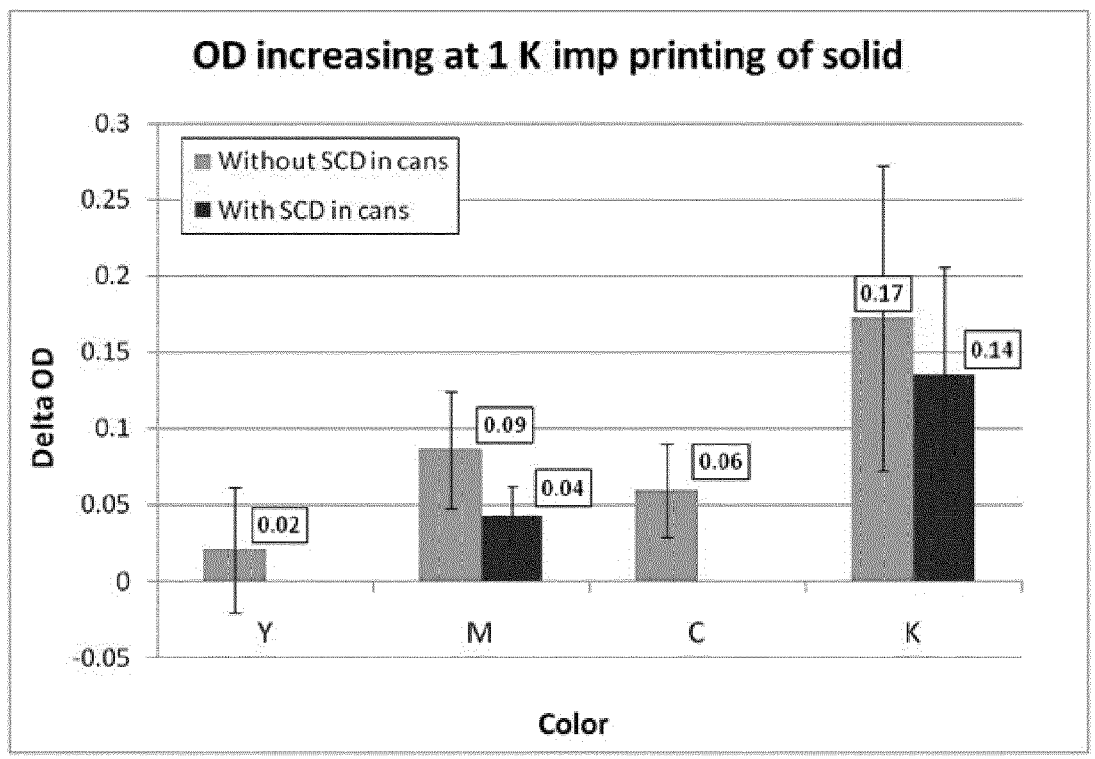
FIG. 4 shows the chart comparing the difference in the change in optical density (Delta OD) when printing with various ink compositions lacking a charge director and ink compositions having a charge director.
Figure 5:
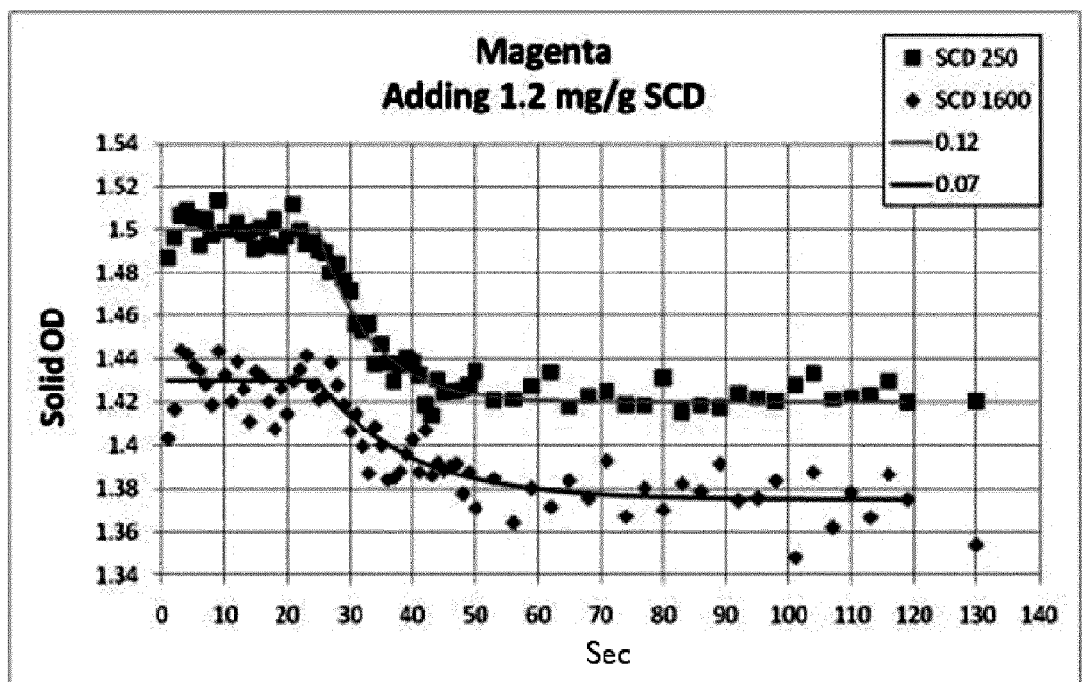
FIG. 5 shows the variation over time of optical density when printing with an example of an ink composition, after addition of an SCD from a certain batch; two different batches are compared: one a 250 L production scale batch, and the other a 1600 L production scale batch.

Another test was carried out for magenta and black inks, again using a Coral ink formulation, and here the present inventors measured the change in OD in an uncharged ink can compare to a charged ink can. The change of OD was normalized to 1 kimp and shows the situation in term of ink charging happens when working with uncharged ink. The results are shown in FIG. 4. Here you can see that the change in Magenta is again ~0.1 in OD with uncharged ink compare to the charged ink can. The difference uncharged and charged is much less in Coral black electrostatic ink (denoted 'K' in FIG. 4), although the SCD consumption is greater. When looking at other colors, Cyan and Yellow consume less SCD and show a change in OD that is smaller than black; the change in OD can easily be corrected on the printing apparatus.

Example 6

Another test aimed to determine the minimal amount of SCD to be added while printing, and the decay constant of OD decline. When adding the CD into an ink dispersion, the charge rises and the OD declines, in general to the OD set point. Starting from the point of addition of the CD, the OD is measured at regular intervals, from which it is possible to calculate the decay constant α of OD down to OD set point. The calculated a for each color was different, but from this it is possible to estimate the time needed to reach the set point.

As an example, if 2 OD points are taken, OD which is the first OD point after the CD addition, $OD_{set\ point}$, which refers to the asymptotic OD SCD consumption start to dictates and the OD starts to rise, and ΔOD which refers to the difference in OD between the first OD point and a second point that appears later on:

$$OD = OD_{set\ point} + \Delta OD e^{-\alpha t}, \text{ leads to } \alpha = -\frac{\ln[(OD - OD_{set\ point})/\Delta OD]}{t}$$

Now, if it is desirable to know what is the time to needed to reach the OD set point, one takes this α, current OD and the desired OD set point after adding CD:

$$t = -\frac{\ln[(OD - OD_{set\ point})/\Delta OD]}{\alpha}.$$

From this it was calculated ~75 sec for YMCK colors. Note, that here an amount of 3 ml of SCD was added while in current press's the smallest amount will be ~0.6 ml for any small addition which suggests a much shorter time.

Figure 6:
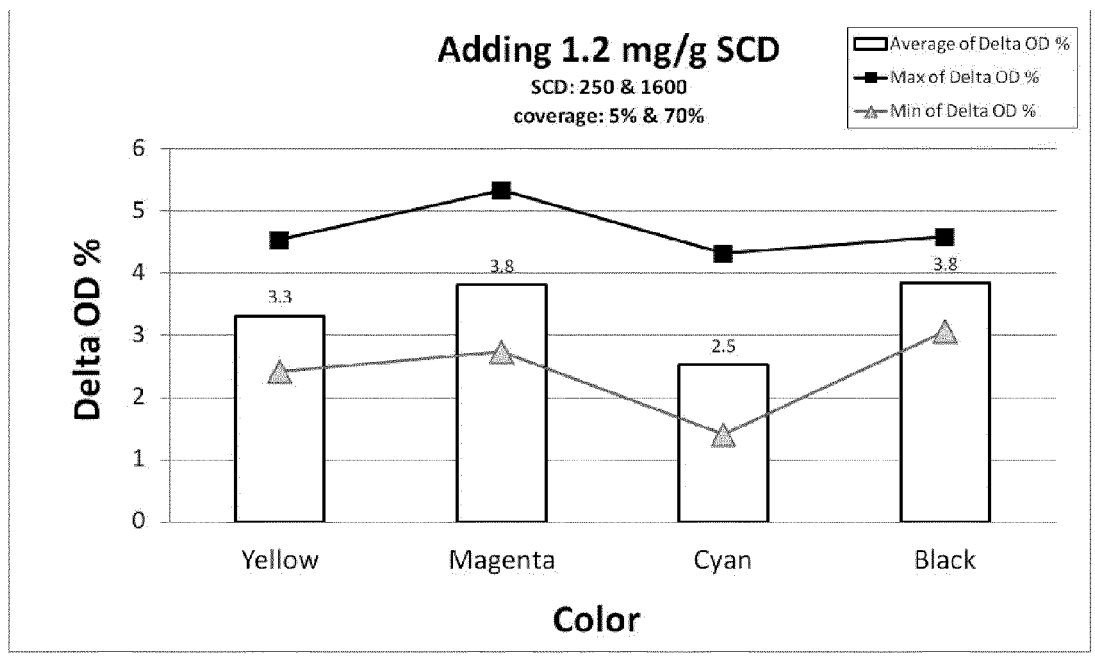
FIG. 6 compares the change in optical density when printing with an ink composition, after addition of a synthetic charge director from a certain batch; two different batches are compared: one a 250 L production scale batch, and the other a 1600 L production scale batch. In each case SCD was added to the composition so that there was 1.2 mg/g of SCD.

Referring to FIG. 6, the present inventors calculated the decay constant, upon this exponential behaviour. For each SCD batch, each color was found to fit the OD data collected. These data were obtained for the 5% coverage printing of ~100 copies after SCD addition. The interesting point here is that when running in 70% coverage after SCD addition about the same α is obtained with no sign for the much intense SCD consumption occurs. Interesting to note that with this amount, which is a significant amount of SD, the consumption at least for the first 100 copies after CD addition do not play a role even when in 70% coverage.

If one takes a change of OD=0.1 per Kimp and knowing that criteria is ~0.03 acceptable change in OD, then it is possible to divide this 1 Kimp (equal to 250 sec) by 3 and get ~80 sec which is the time needed to consume CD and still be in a desired OD window. It is possible to see that the time to reach the set point is about the time for CD consumption or half the total time until the next SCD addition. This confirms that one does not expect a problem for the full CD addition to maintain or less than that for the minimal amount added while printing.

In current Indigo printing press the present inventors saw that change of 0.015 OD is obtained for each 1 ml of SCD (in solution at a concentration of 5.5%). A minimal OD change was estimated to be 0.01 (equivalent to the addition of 0.6 mg/g SCD) and from this, for current press's it is calculated that an amount of 0.6 ml of SCD is desirable. So, for if it was desired to print using inks having a higher percentage in ink solids, e.g. 4.5% solids in the ink composition, it is calculated that a minimal amount of 2.25 ml of SCD is desirable, which contains SCD at a concentration of 5.5% w/w. This is within the current injection system scale for the available printing presses (the lower amount is 1 ml and the higher is 10 ml).

In another test the inventors added 3 ml of 5.5% SCD while printing to produce an ink composition with 1.2 mg SCD/g solids when added to 3% nvs ink tank. After doing so, the inventors monitored the OD change for two types of SCD batches, one in a 250 liter of production scale that gave higher charging characteristics compare to 1600 liter production scale that gave lower charging characteristics. In this test the inventors measured the response to SCD addition of the two batches that confirmed the charging characteristics seen offline. The results are shown in FIG. 6. In this figure, you can see that the line marked with square data points shows the results for the 250 L SCD batch while the line marked with triangular data points show results for the 1600 L SCD batch. The change in OD can be seen to be higher for the 1600 L SCD batch. The average decline in OD after the 3 ml SCD addition was about 3% for 100 copies.

Now when calculating the change of OD per 1 ml of SCD one obtains ~0.015 OD/ml SCD. If this is now used for the higher ink tank in the future press's format where the % solids in ink is 4.5% then:

1 ml×2.5 (the factor of print area per current pint area in current press's)×1.5 (the factor of a higher 4.5% ink solids)= 22 ml. This amount can be delivered by the charge director addition system. At a pump rate 7 sec for each ml of SCD in solution, this equates to 154 sec to pump the 22 ml of solution of SCD into the working dispersion (WD) or ink composition.

Example 7

The present inventors also carried out a test to find out the effect of adding the NCD charge director mentioned above to a commercially available Electroink 4.5 ink composition while printing. The commercially available Electroink 4.5 ink composition is available from Hewlett Packard and already contains NCD at a level of 40 mg/g for a magenta ink or 43 mg/g for a cyan ink.

The test was carried out on an HP 7000 printing press. The test involved printing with 200 copies of low coverage. After the initial 100 copies, 2 ml of an NCD-containing liquid was added (equivalent to 4.4 mg/g NCD, such that the addition of NCD was increasing the concentration of NCD by approximately 10%), and the printing continued until the final 100 copies had been printed.

The inventors measured the low field conductivity during printing, the optical density during printing and the current of the squeegee roller, part of the apparatus that compresses the ink onto the developer roller, before the ink is transferred to the photoimaging plate. Low field conductivity is measured at an electric field amplitude of 5 V/mm, an ac frequency of 5 Hz, and at a temperature of 23° C.

Figure 7:
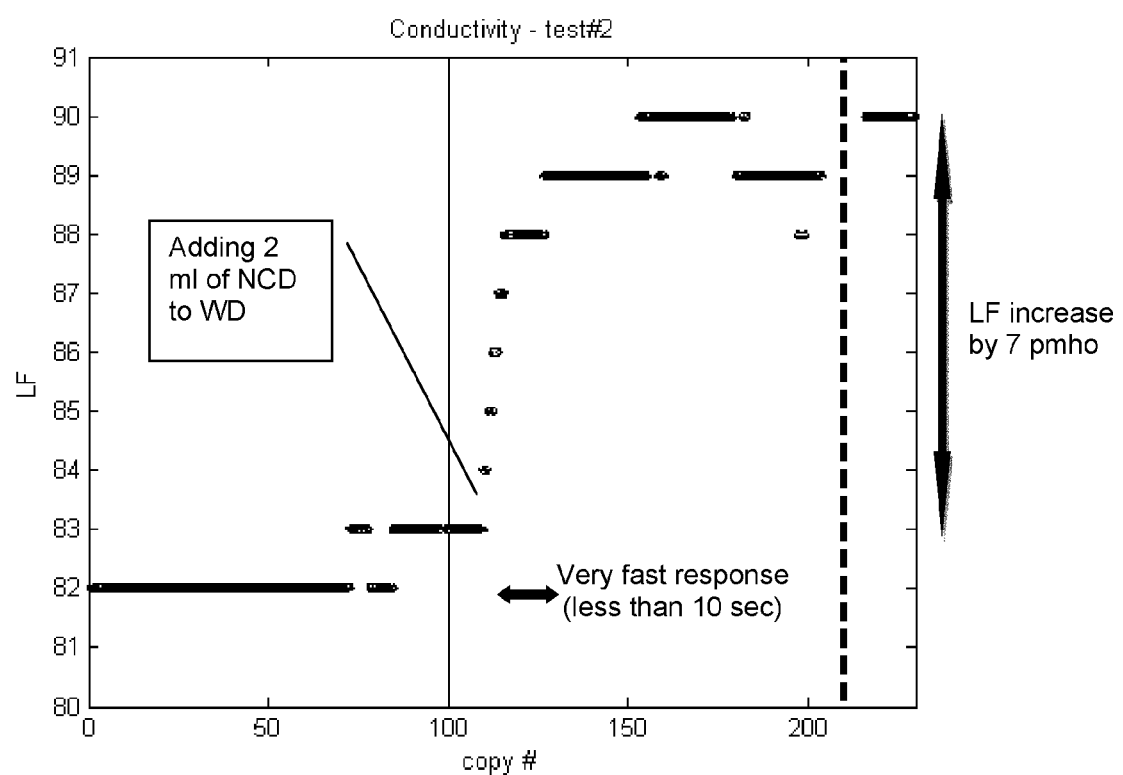
FIGS. 7 and 8 each show low field conductivity (pmho) against the number of copies for, respectively, cyan and magenta ink compositions; see Example 7 for further details on the test.
Figure 8:
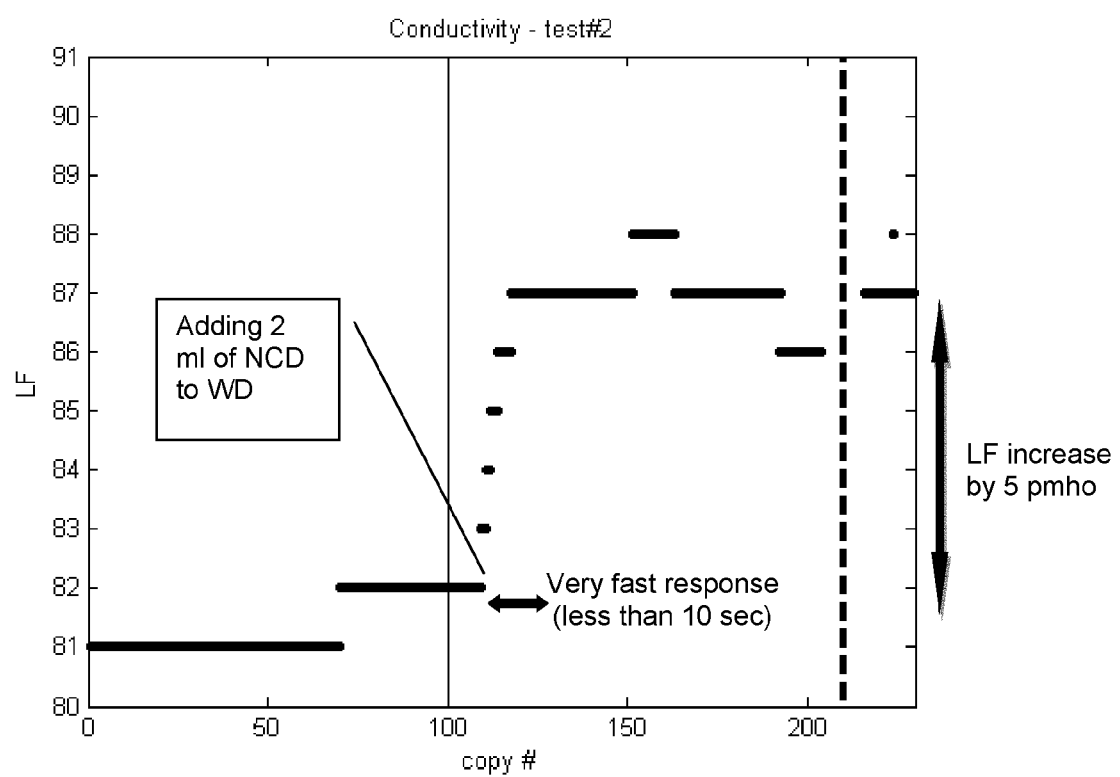

FIGS. 7 and 8 each show low field conductivity (pmho) against the number of copies for, respectively, cyan and magenta ink compositions.

Figure 9:
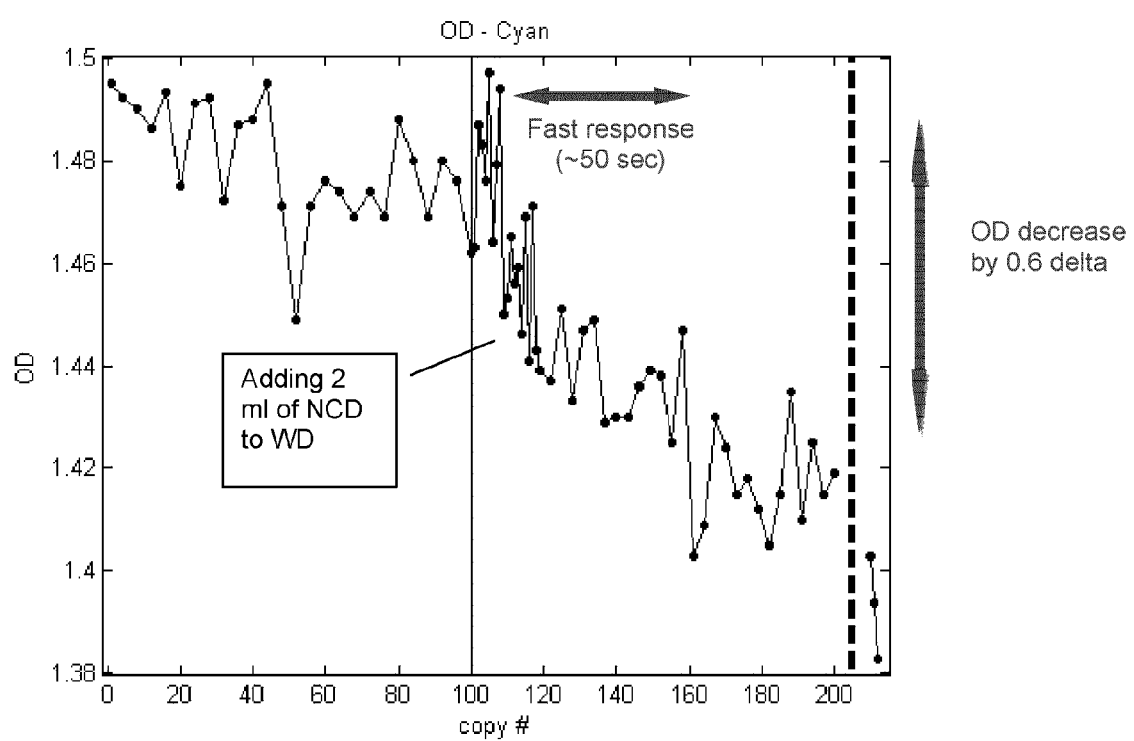
FIGS. 9 and 10 each show the optical density against the number of copies for, respectively, a cyan ink composition and a magenta ink composition; see Example 7 for further details on the test.
Figure 10:
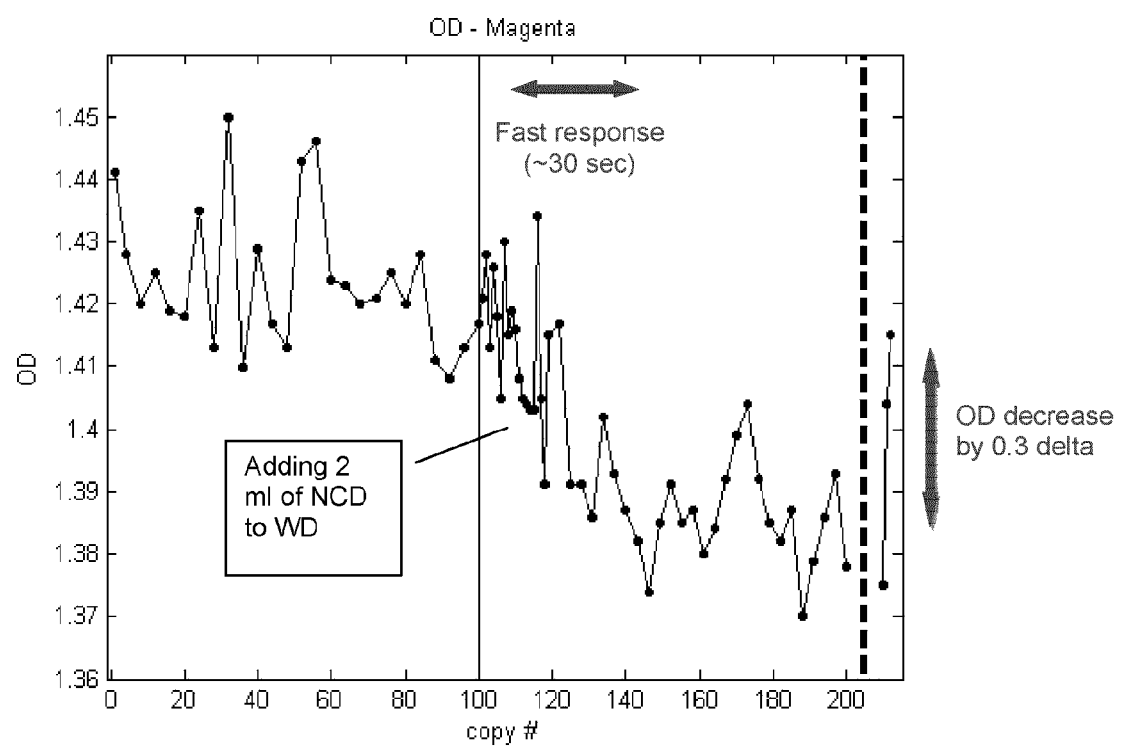

FIGS. 9 and 10 each show the optical density against the number of copies for, respectively, a cyan ink composition and a magenta ink composition.

The present inventors consider that these results demonstrate the fast response when adding 2 ml NCD during printing (less than 50 sec).

While the invention has been described with reference to certain embodiments, those skilled in the art will appreciate that various modifications, changes, omissions, and substitutions can be made without departing from the spirit of the disclosure. It is intended, therefore, that the invention be limited only by the scope of the following claims. Unless otherwise stated, the features of any dependent claim can be combined with the features of any of the other dependent claims.

The invention claimed is:

1. A method for electrostatic printing comprising:
   (i) providing an ink composition comprising: a hydrocarbon carrier liquid and particles comprising a resin and a colorant, and wherein the ink composition contains less than 0.3 mg of charge director per g of solids in the ink composition;
   (ii) adding a charge director to the ink composition, such that the total amount of charge director in the ink composition is at least 0.6 mg per g of solids in the ink composition, and,
   (iii) within a predetermined time of adding the charge director, printing the ink onto a print medium in an electrostatic printing process, wherein the predetermined time is 90 minutes or less.

2. The method according to claim 1, wherein, in step (i), the ink composition is substantially free or free of charge director.

3. The method according to claim 1, wherein, step (ii) involves adding a charge director to the ink composition, such that the total amount of charge director in the ink composition is at least 1 mg per g of solids in the ink composition.

4. The method according to claim 1, wherein the charge director, in step (ii), is selected from the group consisting of metal salts of fatty acids, metal salts of sulfo-succinates, metal salts of oxyphosphates, metal salts of alkyl-benzenesulfonic acid, metal salts of aromatic carboxylic acids or sulfonic acids, zwitterionic compounds, polyoxyethylated alkylamines, lecithin, polyvinylpyrrolidone, and organic acid esters of polyvalent alcohols.

5. The method according to claim 1, wherein the charge director, in step (ii), is selected from the group consisting of oil-soluble petroleum sulfonates, polybutylene succinimides and glyceride salts, sulphonic acids, and sulfonic acid salts.

6. The method according to claim 1, wherein the charge director, in step (ii), comprises (a) a sulfosuccinate salt of the general formula $MA_n$, wherein M is a metal, n is the valence of M, and A is an ion of the general formula $[R_{1'}-O-C(O)CH_2CH(SO_3^-)C(O)-O-R_{2'}]$, where each of $R_{1'}$ and $R_{2'}$ is an alkyl group and (b) nanoparticles of a simple salt, the simple salt selected from the group consisting of $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, and sub-groups thereof.

7. The method according to claim 1, wherein the charge director, in step (ii), comprises (a) a sulfosuccinate salt of the general formula $MA_n$, wherein M is a metal, n is the valence of M, and A is an ion of the general formula $[R_{1'}-O-C(O)CH_2CH(SO_3^-)C(O)-O-R_{2'}]$, where each of $R_{1'}$ and $R_{2'}$ is an alkyl group and (b) an alkyl benzene sulfonic acid.

8. The method according to claim 1, wherein, in step (i) and/or step (ii), the solids content of the ink composition is 35% by weight or more.

9. The method according to claim 1, wherein, in step (i) and/or step (ii), the solids content of the ink composition is 40% by weight or more.

10. The method according to claim 1, wherein, in step (iii), the predetermined time is from 20 minutes to 60 minutes.

11. The method according to claim 1, wherein the resin comprises a polymer having acidic or basic side groups.

12. The method according to claim 1, wherein the resin comprises a first polymer that is a copolymer of ethylene or propylene and an ethylenically unsaturated acid of either acrylic acid and methacrylic acid.

13. The method according to claim 12, wherein the first polymer is absent ester groups and the resin further comprises a second polymer having ester side groups that are a co-polymer of (i) a first monomer having ester side groups selected from esterified acrylic acid or esterified methacrylic acid, (ii) a second monomer having acidic side groups selected from acrylic or methacrylic acid and (iii) a third monomer selected from ethylene and propylene.

14. The method according to claim 1, wherein, in step (i), the ink composition contains the charge director in an amount ranging from greater than 0 mg to less than 0.3 mg of charge director per g of solids in the ink composition.

* * * * *